US 6,378,009 B1

(12) United States Patent
Pinkston, II et al.

(10) Patent No.: US 6,378,009 B1
(45) Date of Patent: Apr. 23, 2002

(54) KVM (KEYBOARD, VIDEO, AND MOUSE) SWITCH HAVING A NETWORK INTERFACE CIRCUIT COUPLED TO AN EXTERNAL NETWORK AND COMMUNICATING IN ACCORDANCE WITH A STANDARD NETWORK PROTOCOL

(75) Inventors: William J. Pinkston, II, Fayetteville, TN (US); Charles H. Williams, Limerick (IE); Paul D. Durden, Gurley; David H. Stafford, Huntsville, both of AL (US)

(73) Assignee: Avocent Corporation, Huntsville, AL (US)

( * ) Notice: Subject to any disclaimer, the term of this patent is extended or adjusted under 35 U.S.C. 154(b) by 0 days.

(21) Appl. No.: 09/379,576

(22) Filed: Aug. 20, 1999

Related U.S. Application Data

(60) Provisional application No. 60/097,804, filed on Aug. 25, 1998.

(51) Int. Cl.[7] .......................... G06F 13/14; G06F 13/42
(52) U.S. Cl. .......................... 710/62; 710/105; 710/316
(58) Field of Search ................................. 710/131, 132, 710/62, 105, 316

(56) References Cited

U.S. PATENT DOCUMENTS

| 4,769,833 A | * | 9/1988 | Farleigh et al. ........ 379/102.01 |
| 5,721,842 A | * | 2/1998 | Beasley et al. .............. 710/131 |
| 5,740,246 A | * | 4/1998 | Saito ........................... 380/21 |
| 5,884,096 A | | 3/1999 | Beasley et al. |
| 6,073,188 A | * | 6/2000 | Fleming ...................... 710/38 |

* cited by examiner

Primary Examiner—Thomas Lee
Assistant Examiner—Ilwoo Park
(74) Attorney, Agent, or Firm—Nixon & Vanderhye PC

(57) ABSTRACT

An apparatus, method, and system for providing control, status, and security functions in a peripheral switch for connecting one or more computers to one or more user stations. Information from a remote terminal is transferred on a network in a packet where the switch information in the packet uses a standardized management protocol. When the packet is received by a network interface card in the peripheral switch the switch information is translated to a proprietary protocol. The peripheral switch then responds to the switch information by performing a control function, providing status information to the remote terminal, or by changing security information. In addition to the transfer of peripheral information from the remote terminal, the peripheral switch is capable of transferring switch information from one of the user stations.

26 Claims, 9 Drawing Sheets

KVM (KEYBOARD, VIDEO, AND MOUSE) SWITCH HAVING A NETWORK INTERFACE CIRCUIT COUPLED TO AN EXTERNAL NETWORK AND COMMUNICATING IN ACCORDANCE WITH A STANDARD NETWORK PROTOCOL

This application claims the benefit of U.S. Provisional Application No. 60/097,804, filed Aug. 25, 1998, the entire content of which is hereby incorporated by reference in this application.

FIELD OF THE INVENTION

This application relates to a switching system for selectively coupling one or more user stations to one of a plurality of computers. Each user station has at least one peripheral, where the peripherals include a keyboard, video display, and a mouse.

BACKGROUND AND SUMMARY OF THE INVENTION

A user typically communicates with a personal computer via peripherals that serve as computer-user interfaces. Such peripherals may include a keyboard, a video display and a mouse. Typically, standard cables connecting each peripheral to the computer are about four feet long and the cables are used to couple one set of peripherals to one computer.

In some computer applications it is desirable to connect one or more user stations having associated peripherals to one or more computers. It is also desirable at times to do so when the user stations and computers are at different locations. For example, users increasingly desire to retrieve information from several computers at other relatively distant locations via a peripheral switch, such as a Cybex Autoboot Commander 4XP. In such a case, the user could remain at one location and cause the peripheral switch to selectively attach up to 3,000 different computers by configuring several Commander 4XPs and using the proprietary protocol of the peripheral switch. It is also possible using peripheral switches to selectively connect several user stations to a plurality of computers. In some of the peripheral switches, because of bandwidth limitations, not all users can operate simultaneously with computers coupled to the peripheral switch.

A peripheral switch typically responds to control information, provides status information, provides some type of security process, and passes data between user stations and computers. Switch information is typically classified as control information, status information, security information, and data.

The arrangement of computers, a peripheral switch, and user stations is typically referred to as a computer switching system. In many computer switching systems the peripherals at each user station comprise a keyboard, a video monitor, and a mouse. Such a grouping is sometimes referred to as a KVM station. The peripheral switch may be referred to as a KVM switch with the just described peripheral limitation.

Typically a computer switching system has a system administrator that has the ability to control the peripheral switch. The system administrator may send control information to the peripheral switch limiting activities of a selected user or user station. Further the system administrator can check the switch status by requesting status information from the peripheral switch. In addition, the system administrator may activate the security system to allow only authorized users to access the peripheral switch.

In some applications it would be desirable to interface the peripheral switch from a remote site. One option would be to provide a dedicated communication channel from the remote site to serve as a means for coupling to the peripheral switch. The dedicated communication channel could use the same proprietary language as the local peripherals and the functionality of the control, status, and security features could be controlled from the remote site. Another method of providing a remote peripheral connection could be implemented using a remote LAN to local LAN connections. The LAN arrangement has a major shortcoming. The remote device does not know the proprietary language of the peripheral switch, hence it would be necessary for the remote device to store the proprietary language of different peripheral switches.

The present invention provides a more efficient and improved method and apparatus to couple a remote site to a peripheral switch. Such a method and apparatus would provide the control, status, and security functions in a way that mirrors the local peripheral administrative functions using industry standard LAN based protocols, such as TCP/IP and at the same time avoid the cost of a dedicated channel.

Figure 5:
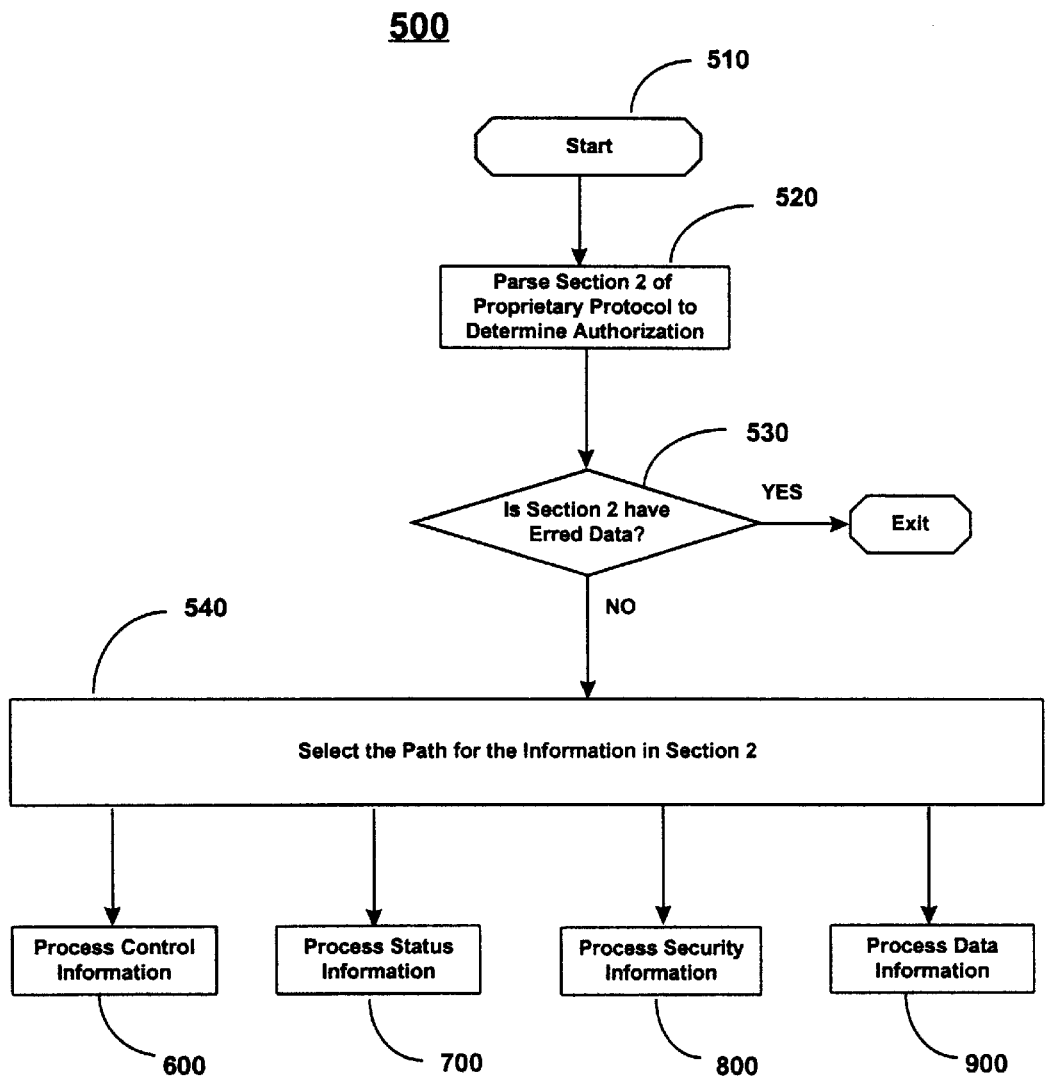
FIG. 5 is a flow chart illustrating the information path of an example embodiment of the present invention.
Figure 7:
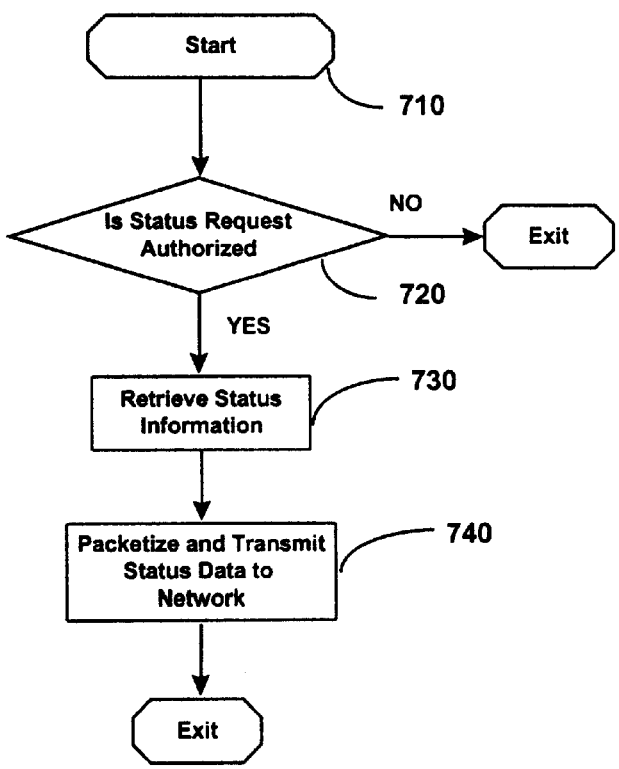
Figure 8:
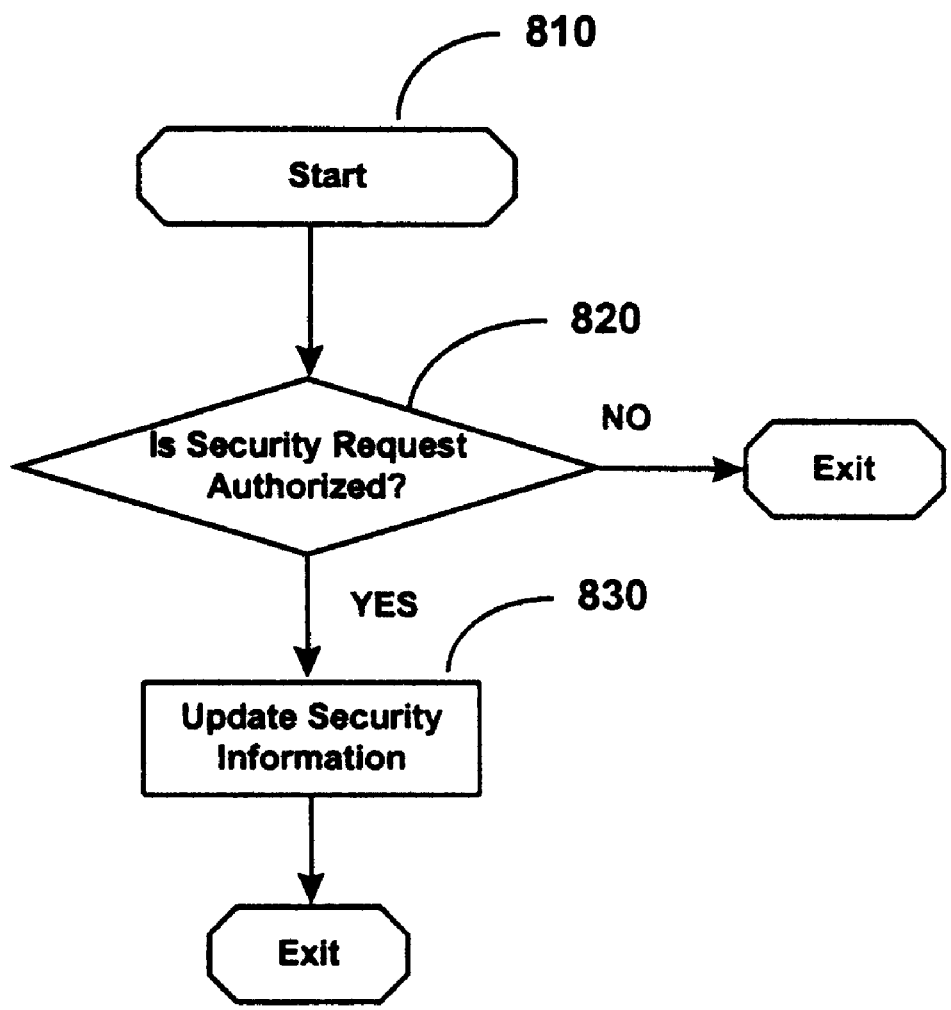
Figure 9:
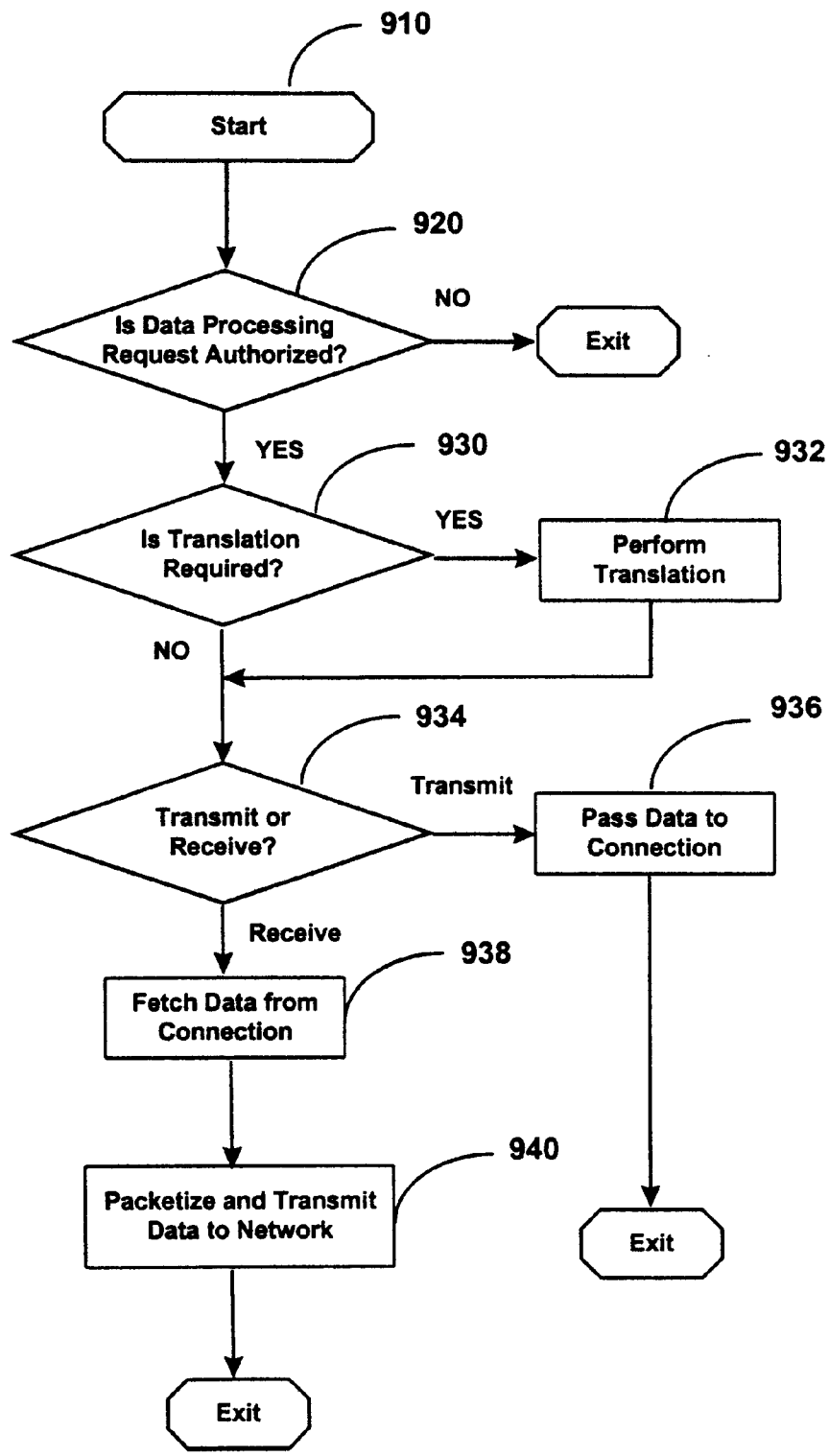

FIG, 6 is a flow chart for control information from FIG. 5;

FIG. 7 is a flow chart for status information from FIG. 5;

FIG. 8 is a flow chart for security information from FIG. 5;

FIG. 9 is a flow chart for data flow from FIG. 5; and

Figure 3:
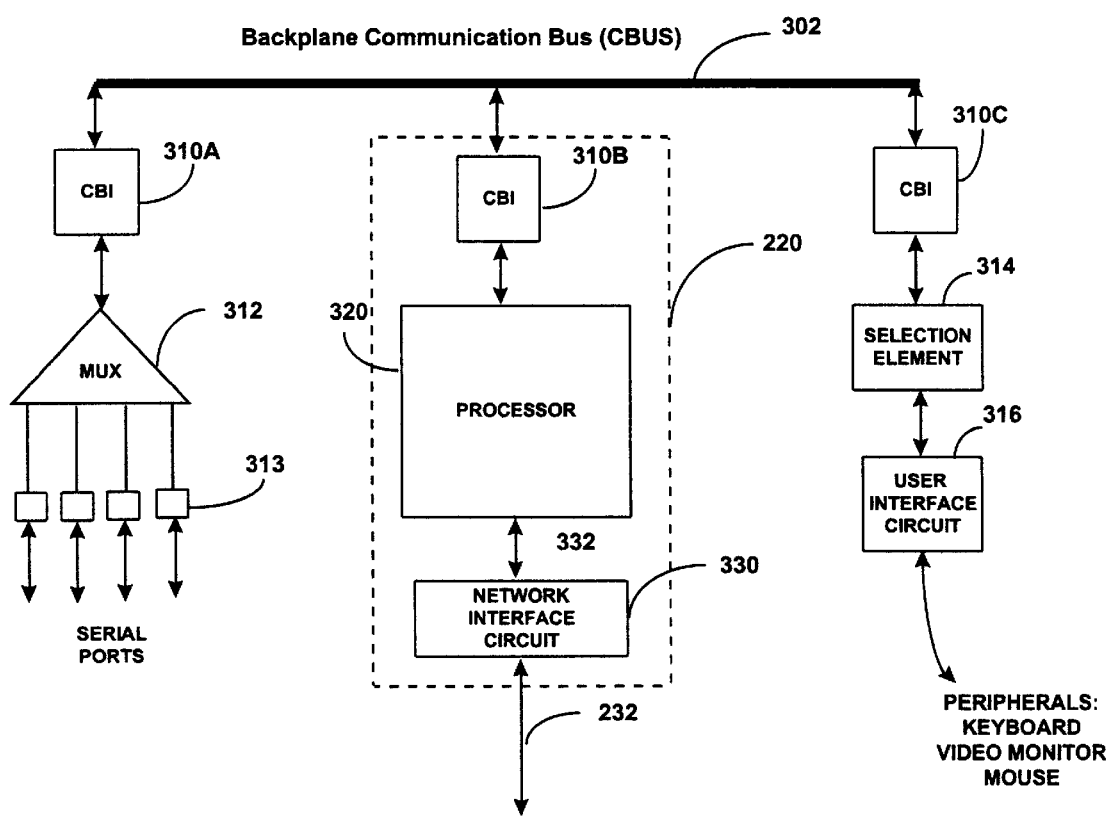
FIG. 3 is a block diagram illustrating in more detail the peripheral switch in accordance with an example embodiment of the present invention.
Figure 10:
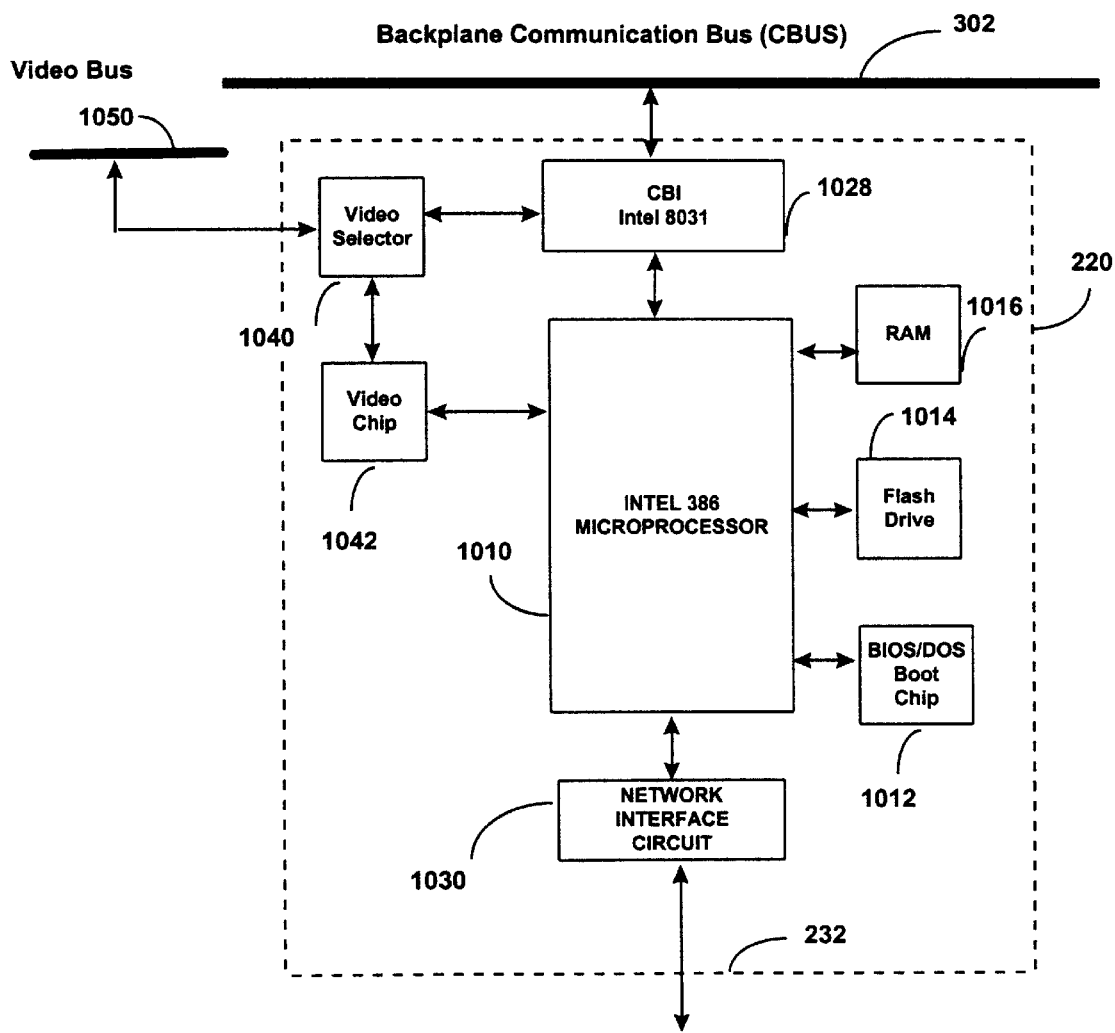

FIG. 10 illustrates hardware aspects of the embodiment of FIG. 3.

DETAILED DESCRIPTION OF THE DRAWINGS

Figure 1:
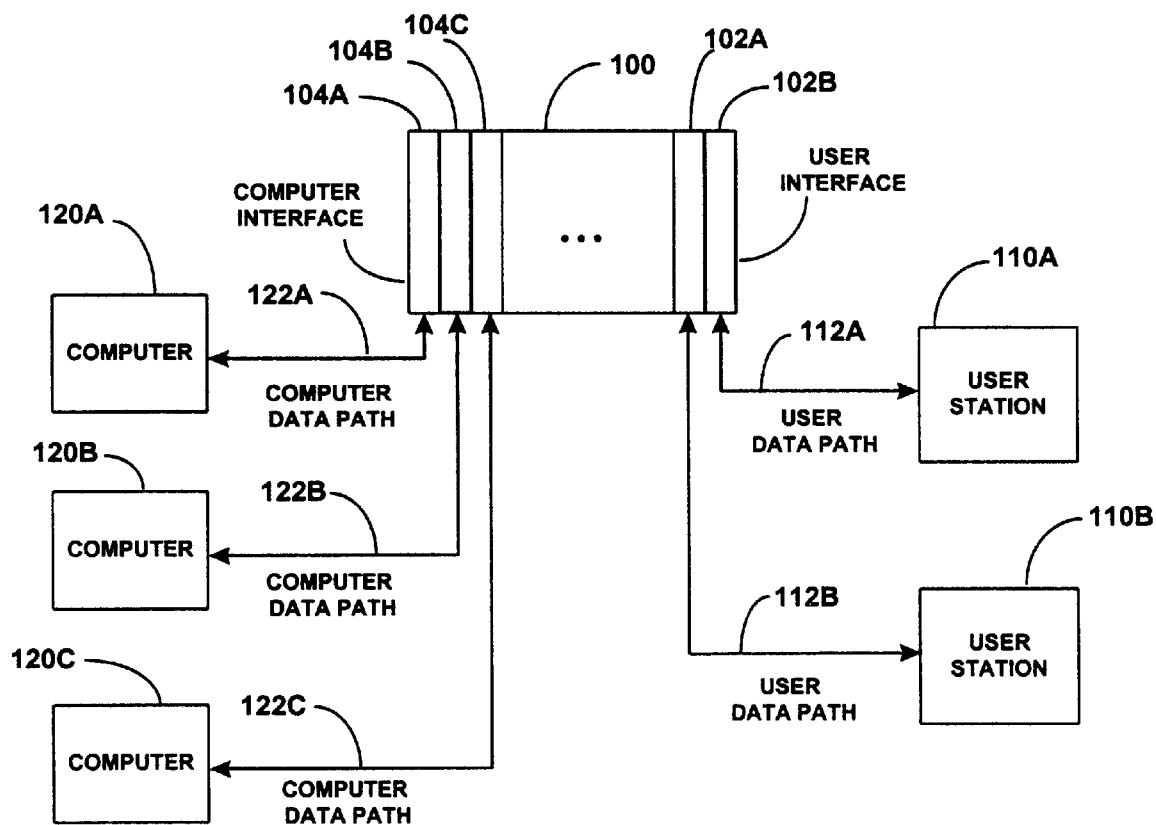
FIG. 1 is a block diagram illustrating a prior art peripheral switch coupling peripherals to computers.

FIG. 1 illustrates a prior art computer switching system having a prior art peripheral switch 100 with user interface cards 102A,B and computer interface cards 104A,B,C. The user stations 110A,B are coupled to the prior art peripheral switch over user data paths 112A,B. The user stations typically have peripherals such as a computer keyboard ("keyboard"), a computer video display ("video"), and a computer mouse ("mouse"). Computers 120A,B,C are coupled to the prior art peripheral switch over computer data paths 122A,B,C. The computers may be Intel based PCs, Macs, Sun Workstations, HP Computers, RS/6000 computers or similar devices. The user data paths may be serial and video cables typically used in computer and peripheral connections. The computer data paths may be typical or special cables. One such prior art peripheral switch, also know as a KVM switch is an AUTOBOOT COMMANDER 4XP made by Cybex Computer Products Corporation of Huntsville, Ala.

The arrangement shown in FIG. 1 may have more than the two user stations and more than three computers. In fact several 4XPs can be used for coupling up to 3,000 computers to several user stations. When the user stations, the prior art peripheral switch, and the computers are coupled together as shown in FIG. 1, the arrangement may be referred to as a KVM island. The prior art peripheral switch 100 has a communication bus and a video bus. The communication bus serves to transfer keyboard information, mouse information, status information, control information and security information and may have a data rate of around 100 kilobits per second. Video signals, requiring higher bandwidths, are transported on one or more video busses.

In prior art systems, switch information, including control information, status information and security information, is transferred between a selected user station and a prior art peripheral switch. The protocol serving to provide the information transfer is a proprietary protocol. A prior art peripheral switch from one manufacturer typically cannot communicate with a prior art switch from another manufacturer.

Figure 2:
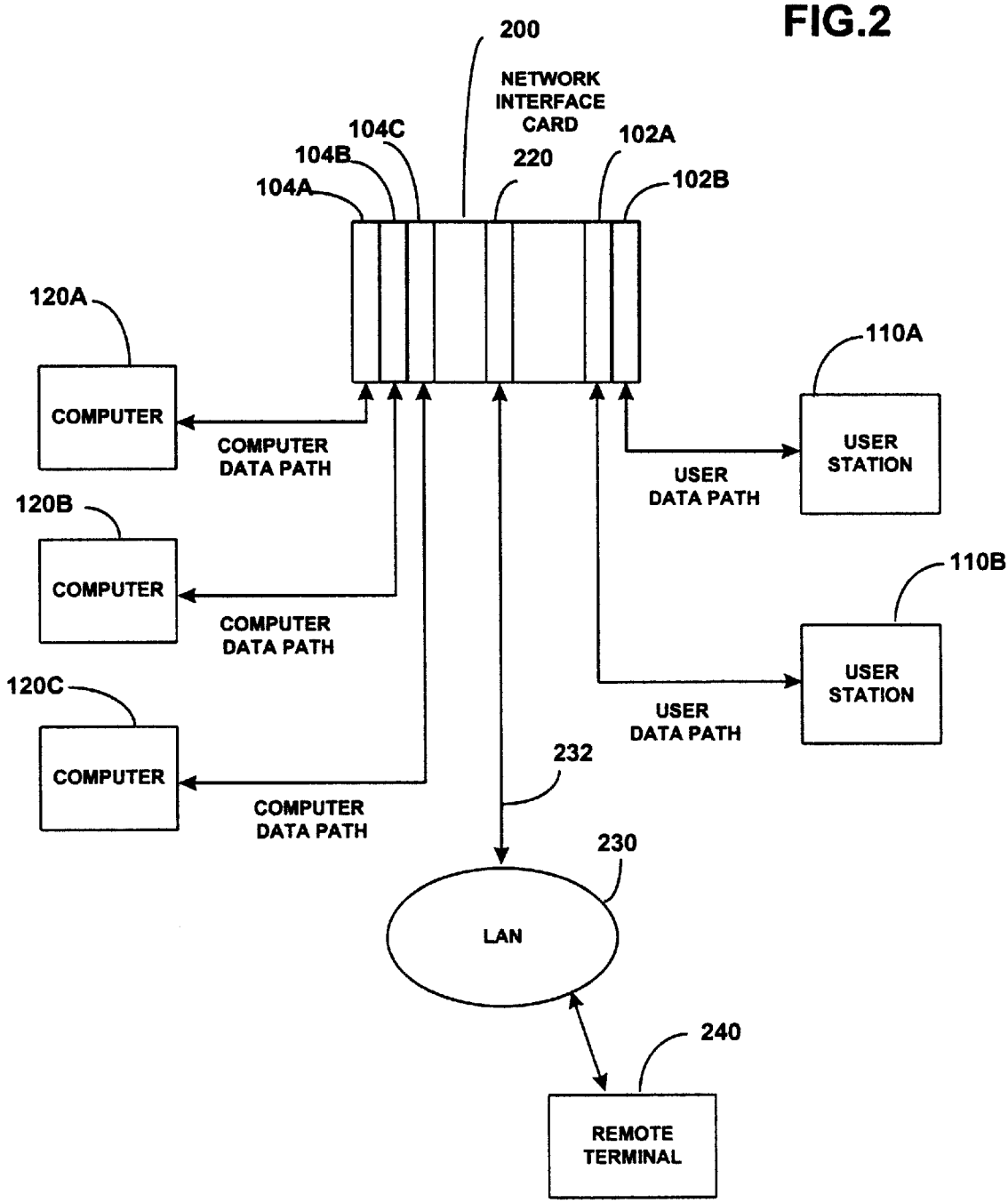
FIG. 2 is a a block diagram illustrating a peripheral switch coupled to computers in accordance with an example embodiment of the present invention.

Referring to FIG. 2, there is illustrated a computer switching system in accordance with the present invention. Computers 120A,B,C are coupled to user stations 110A,B over data paths and through a peripheral switch 200. Peripheral switch 200 has a network interface unit 220 as an element for coupling the peripheral switch to a network 230 which may be a local area network ("LAN") such as an ethernet. The network is coupled to the network interface card 220 using network cable 232. Although the network may be connected to numerous devices, only a remote terminal 240 is shown. The remote terminal serves as a element for remotely providing computer switch administrative functions provided by a user station in prior art computer switching systems.

In FIG. 3 there is illustrated the peripheral switch 200 having communication bus ("CBUS") 302. Computers are coupled to the communication bus via communications bus interface ("CBI") 310A, the network interface unit 220 is coupled to the CBUS via CBI 310B and user stations via CBI 310C. The CBIs serve to transmit and receive switch information and peripheral data from the CBUS using data transfer practices known to those skilled in the art. However, the protocol used in data transfers is typically a proprietary protocol. A multiplexer 312 provides several serial ports 313 for coupling to computer serial ports (not shown). A selection element 314 and user interface circuit 316 couples and directs peripheral information and data to and from the CBUS via CBI 310C. The network interface unit 220 has a processor 320, such as an Intel 386, and a network interface circuit 330 coupled together over two way processor coupling 332. The network interface circuit is coupled to the network 230 over the network coupler 232. The processor is programmed to convert switch information from the remote terminal to the proprietary protocol of the peripheral switch. Information between the network interface circuit and the network is arranged as packets as will be described in FIG. 4.

Figure 4:
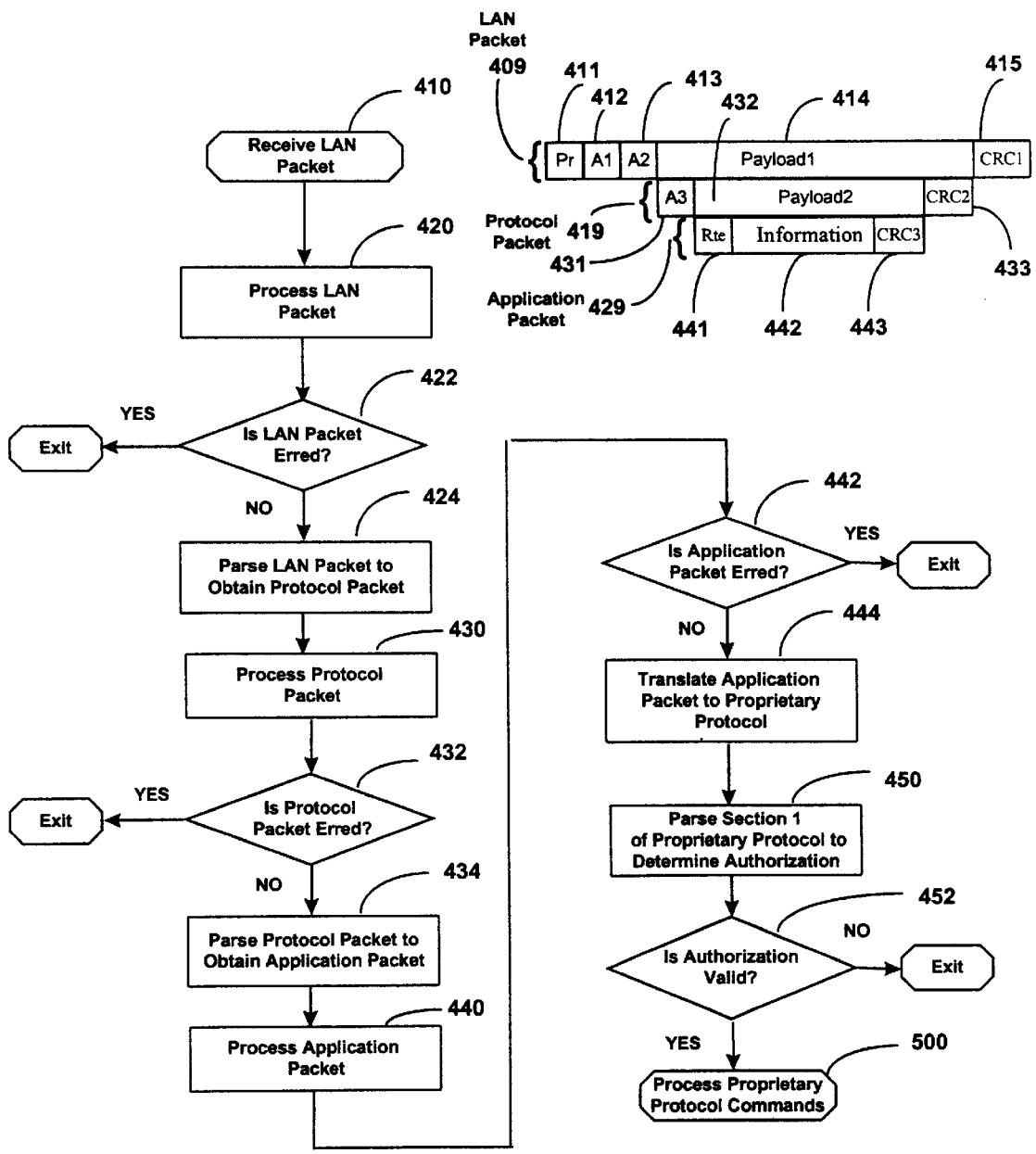
FIG. 4 is a flow chart illustrating information flow and a packet structure in accordance with an example embodiment of the present invention.

When a LAN packet 409, alternatively network packet, is received by the processor the steps in the flow chart of FIG. 4 illustrate the steps required to convert the packet to the proprietary protocol used by the peripheral switch. The LAN packet, is comprised of 5 sections. A preamble sequence 411 is used to synchronize the receiving and transmitting stations, since the communication between the network 230 and the network interface card is bursty and asynchronous. A source address 412 and destination address 413 are required to assure the network packet arrives at the node of the network. The network payload 414 contains the data for the protocol packet 419. A network CRC 415 is provided to assure error free data transfers. The protocol packet contains protocol information 431 including a network logic address, sequencing information, protocol control information and protocol status information. Those skilled in the art of network to computer connections could provide variations in the protocol packet and thus the present invention is not limited in scope to any particular protocol shown. A protocol CRC 433 is provided to assure that an error free protocol packet is transferred. The payload of the protocol packet 432 is an application packet 429. The application packet contains routing information 441, information for the peripheral switch 442, and a application packet CRC 443. The routing information directs the application packet to a translator in the processor for converting a standard management protocol, such as SNMP, to the proprietary protocol of the peripheral switch. Other screen or terminal based protocols, such as TELNET, may also serve to provide access. The information 442 has security authorization data and peripheral switch information including control information, status information, security information and data. Details of the network packet parsing process is illustrated in a flow chart 400.

After being coupled to the processor 320 via network interface circuit 330 the LAN packet 409 is received by the processor, step 410. The LAN packet is processed to determine if LAN packet is error free. If the LAN packet is erred then processing stops at the YES path of step 422. Otherwise, the packet payload is parsed from the LAN packet, step 424, to obtain a protocol packet 419. The protocol packet is processed to determine if the protocol packet is error free, step 430. If the protocol packet is erred, then the processing stops at the YES path of step 432. Otherwise, processing continues on the NO path of step 432. The protocol packet is then parsed, step 434, to obtain the application packet 431. The application packet is processed for errors, step 440. If the application packet is erred, then processing stops at the YES path of step 442. Otherwise, processing continues on the NO path of step 442. The application packet arranged as a standard management protocol, such as SNMP, is then translated to the proprietary protocol of the peripheral switch, step 444. The proprietary protocol has a section 1 containing security authorization information. The security authorization information is obtained by parsing the proprietary protocol, step 450. If the security authorization information is not valid at the NO path of step 452, then processing stops. Otherwise, the proprietary protocol information begins on the NO path of step 452 and step 500.

Referring now to FIG. 5, a flow chart illustrates the processing steps for the proprietary protocol. A second section of the proprietary protocol is separated into authorization information and switch information at step 520. The application packet is checked for errors and the processing ends if an error is detected at the YES path of step 530. If the application packet has no errors then the select step 540 determines the type of information received by the processor and directs the information for control information processing, step 600, status information processing, step 700, security information processing, or data information processing, step 900.

Control information consists of commands to a user interface card or commands routed through the user interface card to other devices within the computer switching system. Examples of commands include responding to status queries, clearing a detected Alarm, setting a threshold of a device Alarm, enabling an Alarm or disabling an Alarm. Control commands are also used to initiate downloading of program data to a system device. Control commands for action by the user interface card include commands that allow the communication bus or user data to be coupled to the remote interface via a LAN. Control commands are also used to start a processor reboot and for system maintenance function control including remote manipulation of time/date functions.

Figure 6:
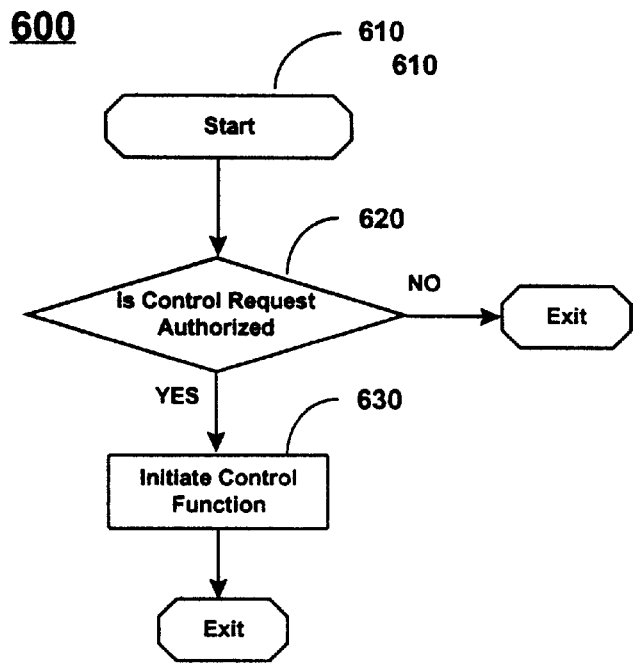

Referring now to FIG. 6, if the LAN packet from the remote terminal is authorized to initiate such a command at the YES path of step 620, then the control information is accepted and the control function initiated at step 630. If authorization is not allowed at the NO path of step 620, then processing stops.

Status information is stored in peripheral switch memory and is typically in table form. Status information is a view of the general system health and configuration. The view includes a list of devices contained within the system, device Alarm status and activity status (online, offline, and connection routings). The user makes control and security decisions based on past and current status information.

Referring now to FIG. 7, if the LAN packet from the remote terminal is authorized to request status at the YES path of step 720, then status information is retrieved at step 730. The retrieved status information is then placed in a return LAN packet at step 740, and sent back to the remote terminal. If a status request is not authorized, then processing stops at the NO path of step 720.

Security information sent to the peripheral switch is used to change authorization profiles. Security information allows limited privileges to users as determined by the system administrator. Referring now to FIG. 8, if the LAN packet from the remote terminal is authorized to update security information at the YES path of step 820, then security information is updated at step 830. If a security update is not authorized, then processing stops at the NO path of step 820.

Data may also be transferred between the peripheral switch and the remote terminal. Such data includes device serial data, mouse data, keyboard data, and digital video data. If the selection step 540 determines the application packet is data, then data is processed by the flow chart 900 of FIG. 9. Data processing starts at step 910, and authorization is verified. If data processing is not authorized at the NO path of step 920, then processing stops. Otherwise, processing continues on the YES path of step 920. Next it is determined if data translation is required, such as translating digital video to analog video. If translation is required at the YES path of step 930, then translation is performed at step 932. If no translation is required, the process continues on the NO path of step 930. If the data has been received at the RECEIVE path of step 934, then the data is directed to a selected connection at step 936. If the data is to be transmitted at the TRANSMIT path of step 934, then the data is fetched at step 938, and packetized at step 940 for transmission back to the remote terminal.

Those skilled in the art of data processing would appreciate that variation in the programs described by the flow charts of FIGS. 4–9 could provide steps to accomplish the overall functions of providing switch information and data to the peripheral switch using a network such as a LAN. The present invention allows a system administrator to communicate with the peripheral switch either from a remote terminal or from a user station. The option of having two communication means allows one means to serve as a backup for he other means.

In addition to the block diagrams and the flow charts above, hardware requirement are shown in FIG. 10. An Intel 386 microprocessor 1010 coupled to a boot chip 1012, to a flash drive 1014, and a RAM 1016 is used as the heart of processor 320. A video chip 1042 is used to convert digital video to analog video. The path taken by the analog video is directed by the video selector 1040 in response to a video control signal from the CBI 1028. The CBI is implemented using an Intel 8031. The interface circuit 1030 is comprised of electrical circuit elements typically used in a network to processor interface. The structure shown and elements used could have variations and still be within the scope of the present invention. Those skilled in the art would recognize the relationship and functionality of the elements shown and arranged in FIG. 10.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a computer switching system having a peripheral switch for connecting one or more computers to one or more user stations, a method of transferring switch information including at least one of control information, status information, security information and data to the peripheral switch from a remote terminal different from the user stations and at a remote site while the peripheral switch simultaneously links a selected one of the computers to a selected one of the user stations, the method comprising:

establishing a communication path between the selected computer and the selected user station using at least one KVM switch port of the peripheral switch;

generating, at the remote terminal, a remote information signal having switch information;

packetizing the remote information signal thereby creating a network packet;

transmitting the network packet to a switch service port of the peripheral switch via a network, the switch service port being different from the KVM switch port of the peripheral switch and being associated with communication of said control information, status information, security information, or data to the peripheral switch for operational use by the peripheral switch;

receiving the network packet at the peripheral switch;

translating the network packet to a proprietary information signal identifying the switch information; and responding to the proprietary information signal identifying the switch information.

2. The method of claim 1 where the translating step comprises:

translating the network packet to a protocol packet;

translating the protocol packet to an application packet; and translating the application packet to a proprietary information signal having the switch information.

3. The method of claim 1 wherein the remote information signal is based on a LAN protocol.

4. The method of claim 1 wherein the network packet has error detection information.

5. A computer switching system, comprising:

a peripheral switch for connecting one or more computers to one or more user stations, the switch including at least one first port for completing a transmission path between a selected computer and a selected user station and a second port for receiving switch information for operational use by the peripheral switch;

a network interface unit for translating a network packet from a remote terminal different from the user station to a proprietary switch signal containing the switch information, the network interface unit comprising:

a network interface circuit for receiving from the second port the network packet and converting the network packet to a processor readable network packet; and a microprocessor programmed to parse the readable network packet by converting the network packet to a protocol packet, then converting the protocol packet to a proprietary packet protocol and upon verifying authorization responding to the switch information contained in the network packet.

6. The network interface unit of claim 5 further comprising:

a communication bus interface for coupling the switch information to a communication bus in the peripheral switch.

7. The network interface unit of claim 6 further comprising;

a video interface circuit for converting serial video to analog video and coupling the analog video to a video bus.

8. The network interface unit of claim 5 wherein the protocol for transferring the network packet to the network interface circuit is TCP/IP.

9. The network interface unit of claim 5 wherein the switch information in the network packet is generated in accordance with a standard management protocol.

10. A KVM switch, comprising:

KVM switching circuitry for establishing communication links between selected computers and selected workstations, and internally communicating via a proprietary data protocol;

a network interface circuit different from the KVM switching circuitry and having a first data interface communicating with the KVM switching circuitry in accordance with the proprietary data protocol and a second data interface coupled to a network external to the KVM switch and communicating in accordance with a standard network protocol.

11. A KVM switch as in claim 10, further including a common housing having KVM ports linking the KVM switching circuitry to a plurality of computers and user stations, wherein:

the KVM switching circuitry and the network interface circuit are contained in the common housing.

12. A KVM switch as in claim 11, further including a back plane in the common housing and wherein the KVM switching circuitry and the first data interface communicate therebetween via the back plane.

13. A KVM switch as in claim 12, wherein;

the first data interface includes a back plane interface circuit coupled between the network interface circuit and the back plane; and the KVM switching circuitry further includes another back plane interface circuit coupled between the KVM switching circuitry and the back plane.

14. A KVM switch as in claim 10, further including a rack and wherein:

the KVM switching circuitry includes a set of computer interface cards communicating with corresponding ones of a plurality of computers, and at least one user peripherals card communicating with external computer peripherals equipment; and the network interface circuit includes a network card having the first and second data interfaces.

15. A KVM switch as in claim 14, further including a data bus and wherein:

the computer interface cards, user peripherals card and network card all communicate with each other on the data bus in the proprietary data protocol.

16. A KVM switch as in claim 15, wherein the network card includes a processor to convert information in the proprietary data protocol received from the user peripherals card on the data bus to the standard network protocol.

17. A KVM switch as in claim 15, wherein the network card includes a processor to convert information in the proprietary data protocol received from the user peripherals card and the computer interface cards on the data bus to the standard network protocol.

18. A KVM switch as in claim 15, wherein the network card includes a processor to convert information in the standard network protocol received from the standard network to the proprietary data protocol for delivery onto the data bus.

19. A KVM switch as in claim 17, wherein the network card includes a processor to convert information in the standard network protocol received from the standard network to the proprietary data protocol for delivery onto the data bus.

20. A KVM switch as in claim 10, wherein the network interface circuit includes a processor to convert information in the proprietary data protocol at the first data interface to the standard network protocol at the second data interface.

21. A KVM switch as in claim 20, wherein the network interface circuit includes a processor to convert information in the standard network protocol at the second data interface to the proprietary data protocol at the first data interface.

22. A KVM switch linking a set of computer peripherals to a selected one of a plurality of computers, including:

a data bus employing a data protocol proprietary to the KVM switch;

a computer interface circuit connected to a selector circuit and establishing a communication link between the selected one of the plurality of computers and the data bus;

a computer peripherals interface circuit connected to the set of computer peripherals to establish a communication link between the set of computer peripherals and the data bus; and a network interface circuit, unique to both the computer interface circuit and the computer peripherals interface circuit connected to a standard network to establish a communication link between the standard network and the data bus including a converter to receive data from the standard network in a standard network protocol and modify it into the data protocol proprietary to the KVM switch for delivery to the data bus.

23. A KVM switch as in claim 22, wherein the data from the standard network includes control data containing information used by the selector circuit to establish the communication link between the selected one of the plurality of computers and the data bus.

24. A switch, comprising:

a data bus;

a video bus;

a user data input port receiving computer peripheral equipment data and putting the peripheral equipment data and putting the peripheral equipment data o the data bus;

a user video output port delivering video data from the video bus;

a computer selector coupled to a plurality of computers and establishing a communication path to a selected one of the computers to receive therefrom the video data;

a computer data output port receiving the peripheral equipment data from the data bus and delivering it to the computer selector for delivery to the selected one of the computers;

a computer video input port delivering the video data from the selected one of the computers for delivery to the video bus; and bidirectional network port, unique to the user data input port, user video output port, computer data output port and computer video input port, for linking the video data and the peripheral equipment data on the data bus to an external network.

25. A switch as in claim 24, wherein the peripheral equipment data includes keyboard data.

26. A switch as in claim 24, wherein the peripheral equipment data includes mouse data.

* * * * *